United States Patent Office 3,074,756
Patented Jan. 22, 1963

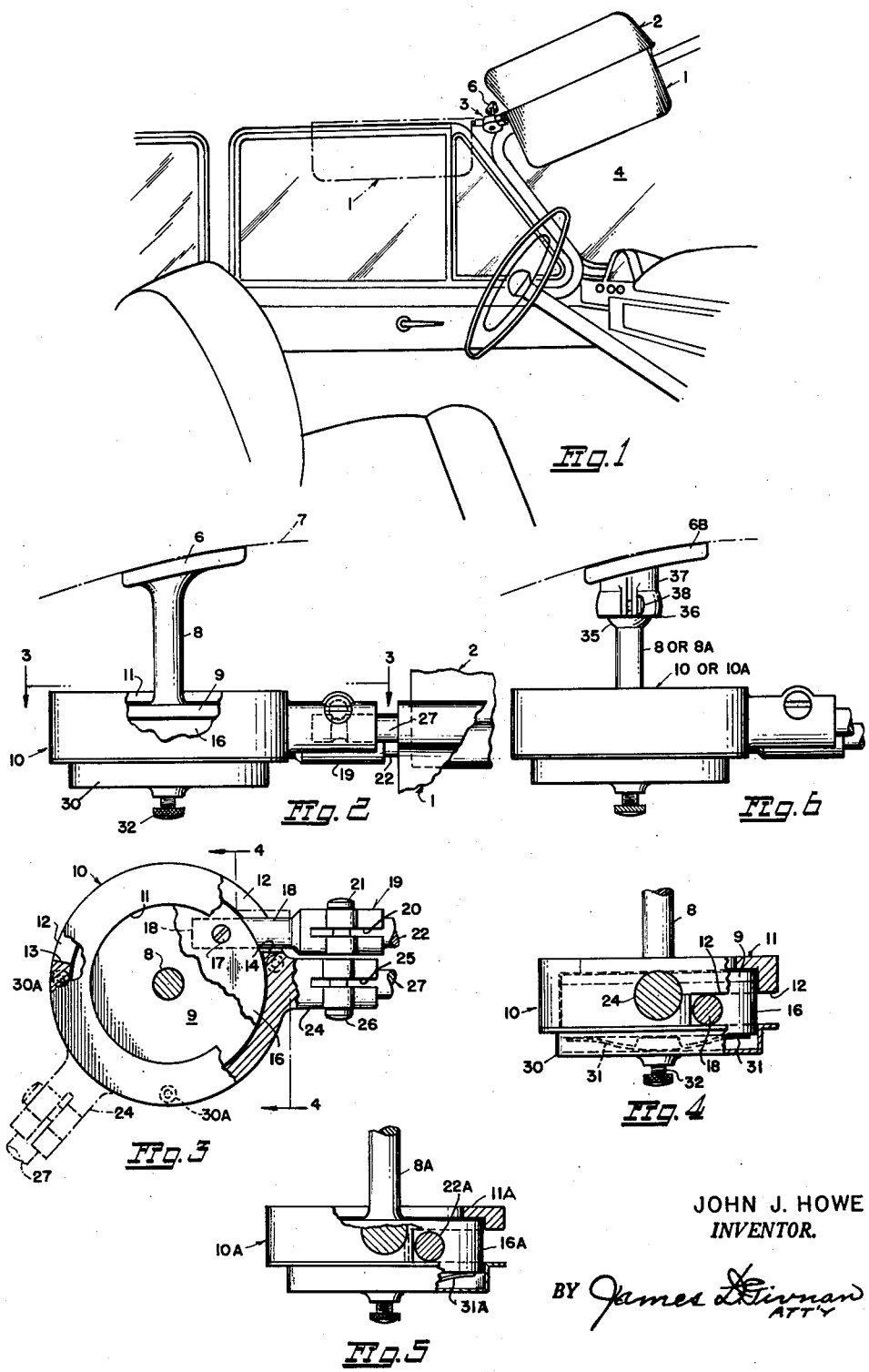

3,074,756
DUAL SUN VISORS AND MOUNTING MEANS THEREFOR
John J. Howe, 411 Washington St., The Dalles, Oreg.
Filed Dec. 6, 1960, Ser. No. 74,033
1 Claim. (Cl. 296—97)

This invention relates to dual visors and means for mounting the same within a vehicle body adjacent the windshield thereof.

The importance of shading the eyes of a driver from the glare of the sun as a matter of protection for the eyes and as an accident preventative has resulted in the development of unitary visors of various types. Such unitary devices, however, have only been useful when turned downwardly relative to the windshield of the vehicle in shading the eyes when driving directly into the sun and when swung outwardly and rearwardly toward or against a side window in providing shade from side rays. In repeatedly swinging a unitary visor from the front to the side as the vehicle changes its direction of travel relative to the rays of the sun, the driver in a partial state of blindness, must endure the hazard of driving with one hand as he manipulates the visor with the other, and subjects his eyes to injury from the tissue damaged by the ultra-violet and infrared rays of the sun which can adversely affect the vision for a protracted period after the exposure.

Accordingly, the principal object of the present invention is to provide a dual visor of the character described and mounting means therefor which are of simple, efficient, durable construction, readily attachable to the interior of a vehicle and comprising two shades which by one adjustment will be individually held in any selected position relative to a windshield and side window of the vehicle to thereby shield the eyes at more than one angle against the sun's rays without any attention on the part of the driver as the vehicle changes its direction of travel.

Another object of the invention is to provide a dual sun visor assembly in which the two shades may be disposed in juxtaposed parallel relation or may be disposed in angular position.

A further object of the invention is to provide a dual sun visor wherein both shades are capable of substantially universal swinging movement individually or as a unit.

A still further object is to provide a mounting for the shades which permits easy manipulation of the shades and at the same time, is effective to hold the shades in any desired position and one which is compensating for wear.

The foregoing and other objects and advantages which will become subsequently apparent reside in the details of construction and operation as more fully hereinafter described and claimed, reference being had to the accompanying drawing forming a part hereof and in which:

FIGURE 1 is a fragmentary interior view of an automobile body provided with dual sun visors and mounting means therefor, in accordance with my invention.

FIGURE 2 is a fragmentary rear elevational view of the dual visors and their mounting means on an enlarged scale.

FIGURE 3 is a sectional top plan view taken approximately along the line 3—3 of FIGURE 2.

FIGURE 4 is a sectional elevational view taken approximately along the line 4—4 of FIGURE 3.

FIGURE 5 is a view similar to FIGURE 4 showing a modified form of the invention, and FIGURE 6 is a view similar to FIGURE 2 showing a further modification.

With continuing reference to the drawing, wherein like reference characters designate like parts, reference numerals 1 and 2 indicate generally and respectively the main and auxiliary visors carried by mounting means indicated generally at 3 secured to the roof of an automobile body directly behind and above the windshield 4. The mounting means 3, which may be advantageously made by die casting, comprises a bracket including a plate 6, adapted for securement in the conventional manner to the roof 7 of the automobile body, and cast integral with the top end of an arm 8 whose bottom end is similarly integrated with a circular plate 9, disposed within a circular housing 10, circumferentially flanged inwardly as at 11 and recessed as at 12 for a portion of its peripheral wall to provide limit stops 13 and 14 for a purpose to be more fully hereinafter described.

Also disposed within the housing 10 is a circular body member 16 into which is secured, by a forced fit and a locking screw 17, one end of an arm 18 whose opposite end is enlarged into a clamping member 19, bifurcated as at 20, provided with a locking screw 21 and adapted to frictionally and/or lockably engage the inner end of the supporting arm 22 for the auxiliary visor 2. Integrated with the side wall of the housing 10 is a similar clamping member 24 bifurcated as at 25 and provided with a locking screw 26 for similar engagement with the supporting arm 27 for the main visor 1.

The bottom of the housing 10 is provided with a closure cap 30 secured to the bottom rim thereof by fastening elements 30A. Disposed within the closure cap 30 and bearing upwardly against the under-side of the circular body member 16 is a cruciform leaf spring 31 whose compressive force against the underside of the body member 16 can be regulated by an adjusting screw 32 extending into the closure cap and bearing centrally against the underside of the leaf spring. The main and auxiliary visors 1 and 2 may be independently turned upwardly or downwardly about the longitudinal axes of their respective supporting arms 22 and 27 and locked relative thereto by the locking screws 21 and 26 in the conventional manner.

As illustrated in full lines in FIGURE 1, the main visor may be turned downwardly directly into the sun's rays or, as shown in broken lines, swung rearwardly and outwardly toward or against a side window of the vehicle, or until the limit stop 13 abuts the arm 18 of the auxiliary visor assembly, to provide shade from side rays. Such swinging movement of the main visor 1 and housing 10 may be accomplished without imparting rotary motion to the circular member 16 which is firmly held by the frictional engagement of its entire flat top surface with the corresponding bottom surface of the plate 9 which renders ineffective the frictional contact between flange 11 of the housing and the top marginal edge of the plate 9 and the central point of contact of the spring 31 with the closure 30.

In the modified form of the invention illustrated in FIGURE 5, I dispense with the plate 9 and instead integrate the bottom of the arm 8A with the circular member 16A. By this arrangement the member 16A and hence the auxiliary visor-supporting arm 22A and the visor carried thereby are fixedly held against any rearward swinging movement, while the housing 10A may be swung laterally into any desired position and so held by the compressive force of the spring 31A against the bottom of the member 16A and transmitted therethrough to the flange 11A of the housing 10A.

The further modification shown in FIGURE 6 is illustrative of the fact that either housing 10 or 10A is capable of substantially universal movement by means of a ball member 35 integrated with the top end of the arm 8 or 8A and engaged within a split socket 36 integrated with an arm 37 depending from the plate 6B and provided with a clamping screw 38.

From the foregoing it will be readily apparent that I have provided a new and novel dual visor assembly comprising a main visor, an auxiliary visor and mounting means for the assembly which includes a bracket adapted for installation within an automobile body as a replacement for the conventional visor-mounting bracket. The invention also includes means enabling the main visor to be turned downwardly and used as heretofore to provide shade from sun rays either from the front or from the side of the vehicle.

In starting upon a journey over roads known to be tortuous the driver may swing the main visor 1 to the broken line position shown in FIGURE 1, then turn the auxiliary visor 2 down to the full line position previously occupied by the main visor. Both visors will remain firmly held in their respective positions by the frictional interengagement of the circular member 16 and plate 9 of FIGURE 2 or the similar engagement of the housing 10A with the circular member 16A of FIGURE 5.

The main visor 1 when not in use may be turned upwardly to lie against the auxiliary visor 2 when in the inoperative position shown in FIGURE 1 and both visors may be adjusted as a unit, by the ball and socket arrangement 35—36, to accommodate the assembly of various roof curvatures and the operative range of the visors relative to the windshield and the side window of the automobile. The assembly may then be locked in the adjusted position by the clamping screw 38.

While I have shown particular forms of embodiment of my invention, I am aware that many minor changes therein will readily suggest themselves to others skilled in the art without departing from the spirit and scope of the invention. Having thus described my invention what I claim as new and desire to protect by Letters Patent is:

Dual visors and mounting means therefor, comprising in combination a plate adapted for securement to the roof of a vehicle body and integrated with the top end of a vertical arm, a circular plate integrated with the bottom end of said arm, a downwardly opening circular housing having a peripheral wall, said wall having a downwardly opening recess therein for a portion of its circumference, said housing rotatably carried by and surrounding said plate, a circular member disposed within said housing, closure means for the bottom end of said circular housing, friction means interposed between said closure means and the bottom of said circular member whereby to engage said circular member with said circular plate to hold said circular member and said housing against rotation, a first visor-supporting arm attached to said circular housing, a main visor carried by said first arm, a second visor-supporting arm attached to said circular member and projecting outwardly therefrom through said recess in the peripheral wall of said housing, and an auxiliary visor carried by said second arm, whereby said main visor and its supporting arm may, through the medium of said housing, be swung rearwardly and outwardly from a position adjacent the windshield of the vehicle toward or against a side window thereof without disturbing the setting of said auxiliary visor.

References Cited in the file of this patent

UNITED STATES PATENTS

| | | |
|---|---|---|
| 1,599,183 | Phillips | Sept. 7, 1926 |
| 2,634,161 | Beets | Apr. 7, 1953 |
| 2,878,714 | VanDenburg | Mar. 24, 1959 |
| 2,917,186 | Beets | Dec. 15, 1959 |
| 2,965,415 | Dryden | Dec. 20, 1960 |

FOREIGN PATENTS

| | | |
|---|---|---|
| 696,429 | Great Britain | Sept. 2, 1953 |